Sept. 19, 1939.   G. R. BOTT   2,173,247

SEAL FOR BALL BEARINGS

Filed Nov. 13, 1937

INVENTOR.
George R. Bott (Deceased)
By The Stamford Trust Company,
Executor.
By C. P. Goepel ATTORNEY.

Patented Sept. 19, 1939

2,173,247

UNITED STATES PATENT OFFICE 2,173,247

SEAL FOR BALL BEARINGS

George R. Bott, deceased, late of Stamford, Conn., by The Stamford Trust Company, executor, Stamford, Conn., assignor to Norma-Hoffman Bearings Corporation, Stamford, Conn., a corporation of New York Application November 13, 1937, Serial No. 174,475

1 Claim. (Cl. 288—11)

This invention relates to seals for ball or roller bearings, and has for its object to provide a seal which may be readily applied to a bearing ring and also conveniently removed therefrom for replacement purposes.

More particularly, the invention consists of a seal for bearings, which consists of an artificial rubber ring held in position by a metallic ring in a manner to compress part of the rubber ring and subject other parts to tension, whereby a tight fit against the outer and inner race rings is obtained.

Preferably, the artificial rubber utilized in the carrying out of this invention is flexible, heat resistant to 300° F., is not affected by gasoline, oil or grease, and does not oxidize. Preferably, the metallic ring is a split ring.

The seal may be applied to one or the other bearing race ring, but preferably is applied to the outer race ring, and acts upon the inner race ring to act as a barrier between the rings against the inflow of dust and the outflow of oil. Such a seal minimizes the possibility of noise, the warping of plates heretofore proposed as seal members, and the use of felt which developed unsatisfactory conditions in the operation of bearings.

The invention will be more fully described hereinafter, embodiments thereof shown in the drawing, and the invention will be finally pointed out in the claim.

In the accompanying drawing.

Similar characters of reference indicate corresponding parts throughout the various views.

Figure 4:
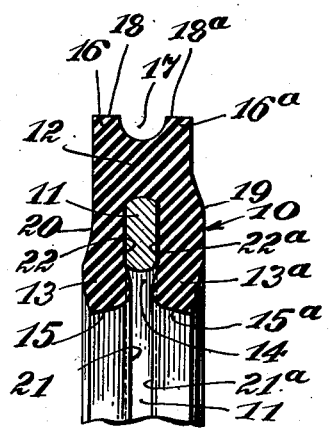
Figure 4 is a sectional view of the seal prior to its application to a bearing.

Referring to the drawing, and more particularly to Figure 4, the seal consists of two parts. One part is the rubber ring, generally indicated by 10, and the other part is a metallic ring, generally indicated by 11. The rubber ring 10 is composed of artificial rubber, which is flexible, heat resistant to 300° F., not affected by gasoline, oil or grease; and does not oxidize. It is practically indestructible, and when subjected to the action of the metallic ring its compressed portion cannot be flexed thereafter. The rubber ring 10 has a body portion 12 with two extending leg portions 13 and 13a having a gap 14 therebetween. The outer surfaces of these leg portions are substantially flat as shown at 15 and 15a, so as to be able to bear against a flat surface of a race ring. These flat surfaces 15 and 15a form external peripheral portions of the rubber ring. The body portion 12 has also two extending leg portions 16 and 16a, and between these there is a space or gap 17, the leg portions 16 and 16a having flat surfaces 18 and 18a adapted to seat against a flat surface of a race ring. One lateral contour of the rubber member 12 is curved outwardly as shown at 19, and the other contour is curved slightly as shown at 20. The curved portion 20 is preferably so shaped as to give the largest volume for grease or the like between the ball or roller and the proximate surface of the rubber body; and the other curved portion indicated by 19 is so shaped as to add strength to the rubber member. The extensions 13 and 13a at their sides adjacent the space 14, are provided with bulged portions 21 and 21a. Preferably, narrow spaces 22 and 22a are provided between the ring 11 and legs 13 and 13a.

Preferably, the ring 11 is a split ring, so as to exert a radially outward pressure against the body portion 12. With the split ring 11 exerting its pressure radially outward, the legs 13 and 13a have a tendency to be moved towards each other, as shown in Figure 4.

To enable the improved seal as shown in Figure 4 to be applied to a ball bearing, means for holding the same must be provided. One form is the recess or groove 26 having two shoulders 27 and 27a arranged in the outer race ring 28 at one side of the balls 29. A complementary cut out 30, having a shoulder 31 is provided in the inner race ring 32, also at one side of the balls 29. The usual ball cage is shown at 33.

Figure 1:
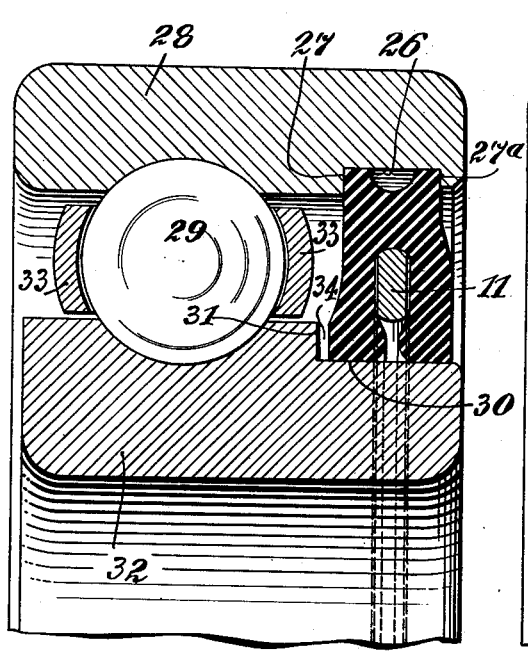
Figure 1 is a longitudinal section of part of a ball bearing showing my improved seal applied thereto.

When the seal shown in its free position in Figure 4 is applied to the bearing, the flat surfaces 16 and 16a are pressed against the flat circumferential surface of the groove 26, and the lateral sides of the body portion 12 are pressed slightly into the groove, so that the rubber on expansion will press against the shoulders 27 and 27a. Thereby, a tight and snug fit is obtained. The free ends of the extensions 13 and 13a are then pressed against the flat circumferential surface of the inner race ring 32. Preferably, a space 34 is provided between the shoulder 31 and the proximate portion of the rubber seal, as shown in Figures 1 and 2.

Figure 2:
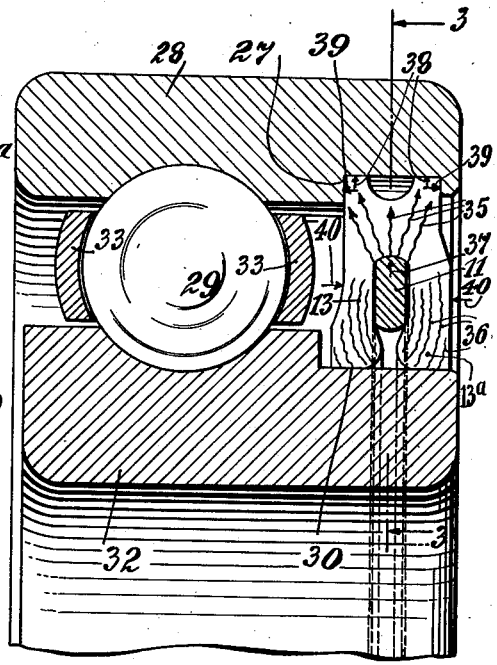
Figure 2 is a similar view showing diagrammatically the lines of force, such as develop in the application of the improved seal to a bearing.
Figure 3:
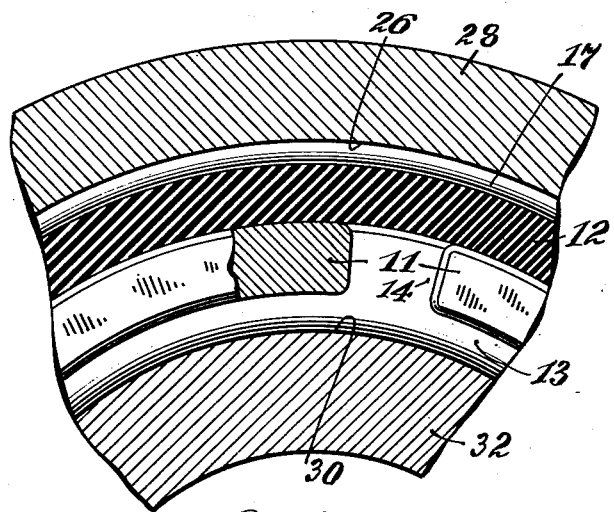
Figure 3 is a section taken on line 3—3 of Figure 2.

After the seal as shown has been applied to a bearing as described, certain forces act, and these are shown diagrammatically in Figure 2. The split ring 11 exerts its radially outward force thus setting up lines 35 of compression, while the legs 13 and 13a are subjected to lines 36 of tension as shown in Figure 2. The arrows 37 indicate the direction of the radially outward force; the arrows 38 the forces acting upon the outer race ring in a radial direction, and the arrows 39 those acting against the shoulders 27 in a lateral direction. The arrows 40 indicate inwardly acting forces.

It will be noted that the ring 11 acting upon the rubber portion 12 compresses the same, and presses it against the outer race ring, whereas the legs while under tension, nevertheless, due to their configuration, exert a compressing action upon the inner race ring, and thus provide a very effective seal.

It is obvious that various changes and modifications may be made in the details of construction and design of the above specifically described embodiments of this invention without departing from the spirit thereof, such changes and modifications being restricted only by the scope of the following claim:

What is claimed is:

A seal for ball bearings, comprising an unbroken ring of deformable and inherently resilient elastic material, having a body portion with a circumferential groove extending around its periphery, outer race ring contacting portions with substantially flat surfaces spaced apart by said groove and extending in one direction from said body portion, spaced leg portions extending from said body portion in a direction opposite to said contacting portions, each leg portion being substantially in line with each of said contacting portions, said leg portions forming at their inner ends inner race ring contacting portions with substantially flat surfaces, and a metallic ring having a radially outward force pressing action against the body portion in the space between the legs, causing the ends of the legs to extend inwardly towards each other while remaining spaced from each other, whereby the flat surfaces of the ends of the legs exert a pressure action upon the inner race ring when applied thereto.

THE STAMFORD TRUST COMPANY,
*Executor of the Estate of George R. Bott, Deceased,*
By CLARENCE E. THOMPSON,
*President.*